United States Patent
Kaercher et al.

(10) Patent No.: US 7,926,345 B2
(45) Date of Patent: Apr. 19, 2011

(54) APPARATUS FOR MEASURING A FILLING LEVEL

(75) Inventors: Sacha Kaercher, Offenbach (DE); Wolfgang Vogt, Karlstein (DE); Wilfried Harfst, Mainz (DE)

(73) Assignee: Areva NP GmbH, Erlangen (DE)

( * ) Notice: Subject to any disclaimer, the term of this patent is extended or adjusted under 35 U.S.C. 154(b) by 58 days.

(21) Appl. No.: 12/325,447

(22) Filed: Dec. 1, 2008

(65) Prior Publication Data

US 2009/0293608 A1    Dec. 3, 2009

Related U.S. Application Data

(63) Continuation of application No. PCT/EP2007/002233, filed on Mar. 13, 2007.

(30) Foreign Application Priority Data

May 29, 2006 (DE) .......................... 10 2006 025 220

(51) Int. Cl.
*G01F 23/00* (2006.01)
(52) U.S. Cl. ........................................................ 73/295
(58) Field of Classification Search .................... 73/295
See application file for complete search history.

(56) References Cited

U.S. PATENT DOCUMENTS

| 4,449,403 A | 5/1984 | McQueen |
| 4,785,665 A | 11/1988 | McCulloch |
| 5,600,528 A | 2/1997 | McQueen |

FOREIGN PATENT DOCUMENTS

| DE | 19714534 A1 | 5/1998 |
| RU | 2153712 C1 | 7/2000 |

OTHER PUBLICATIONS

International Search Report dated Aug. 16, 2007.

*Primary Examiner* — Hezron Williams
*Assistant Examiner* — Alex Devito
(74) *Attorney, Agent, or Firm* — Laurence A. Greenberg; Werner H. Stemer; Ralph E. Locher

(57) ABSTRACT

An apparatus for measuring the filling level in a liquid vessel, in particular in a reactor vessel of a nuclear-engineering plant, with a plurality of elongate, spaced-apart measurement tubes. Each measurement tube has a number of thermocouples which are distributed in the longitudinal direction. A thermocouple, which acts as a primary signal transmitter, is heated by a heating element and is arranged on a first measurement tube, has assigned to it on the signal side an unheated thermocouple, which acts as a reference signal transmitter and is arranged on a measurement tube which is different from the first measurement tube.

13 Claims, 2 Drawing Sheets

APPARATUS FOR MEASURING A FILLING LEVEL

CROSS-REFERENCE TO RELATED APPLICATION

This application is a continuation, under 35 U.S.C. §120, of copending international application No. PCT/EP2007/002233, filed Mar. 13, 2007, which designated the United States; this application also claims the priority, under 35 U.S.C. §119, of German patent application No. DE 10 2006 025 220.9, filed May 29, 2006; the prior applications are herewith incorporated by reference in their entirety.

BACKGROUND OF THE INVENTION

Field of the Invention

The invention relates to an apparatus for measuring the filling level in a liquid vessel, in particular in a reactor vessel of a nuclear plant. The apparatus is based on the use of heated and unheated thermocouples as signal transmitters.

Measuring apparatuses or filling level probes in which the filling level in a liquid vessel is inferred using the thermovoltage produced by a heated thermocouple are used in particular in nuclear power plants since they are relatively insensitive to radioactive radiation compared to measuring apparatuses based on other measurement principles and can therefore also function reliably in the case of an incident using radiation values which may be increased. Such measuring apparatuses are used in particular in the reactor pressure vessel of a pressurized-water reactor for monitoring therein the level height of the cooling liquid flowing through the primary circuit of the power plant installation above the fuel assemblies.

The measurement principle makes use of the different heat transfer characteristics which occur when heat is transferred from a heating element to a liquid coolant surrounding the heating element, on the one hand, and to a gaseous or vaporous medium, on the other hand. As long as the liquid cooling medium surrounds the heating element, the heat generated by the latter is dissipated quickly, with the result that even in its immediate vicinity the temperature lies only negligibly above that surrounding temperature which would occur in the unheated case. If now, by way of example, the situation arises during regular reactor operation or also in the case of a reactor incident that, due to the manner of operation or to a pressure drop in the primary circuit, the liquid level in the reactor pressure vessel sinks below the level of the heating element, that is to say the latter is surrounded by vaporous coolant, and thus the heat transfer characteristics deteriorate. As a result, the temperature surrounding the heating element increases which can be detected by a thermometer mounted adjacent to the heating element or a temperature sensor. Suitable temperature sensors used due to their reliable and robust operating method are typically thermocouples which provide a thermovoltage which is largely proportional to the temperature.

Usually a number of heated thermocouples are arranged at mostly regular spacings on a rod-shaped or tube-shaped support or on an elongate measurement tube which is immersed in the liquid to be monitored with regard to its level height and inside which the supply and signal lines necessary for the supply of power to the heating elements and for the transmission of signals to an external evaluation unit are also guided. The sensors or measurement positions arranged at various heights thus permit a digital, physically discrete display of the filling level height in the vessel, with the (spatial) resolution being a function of the number of thermosensors per height section. A measuring apparatus of that type is known for example from Russian patent RU 2153712 C1. In addition to the heated thermocouples acting as primary signal transmitters, a plurality of unheated thermocouples which supply a reference signal assigned to the respective primary signal are also arranged inside the measurement tube. In this manner, it is also possible to take into account a temporal variation of the liquid or surrounding temperature when evaluating the temperature information and determining the filling level height therefrom. Without such a measure, for example, an increase or decrease in the liquid temperature could erroneously be interpreted as a variation in the filling height or an actual change in the filling height could be "covered up" by a simultaneous change in the liquid temperature.

In the measuring apparatus according to the Russian patent RU 2153712 C1, the unheated thermocouples are in each case arranged inside the measurement tube in a manner such that their height is offset with respect to the heated thermocouples, with the result that they are protected at least to a certain extent against the influence of the heating elements or heating zones which act on the heated thermocouples. Thermal interactions, that is to say undesired heating of those thermocouples which are usually not heated, are nevertheless not impossible and can under certain circumstances falsify the measurement results.

On the other hand, because the heated and unheated thermocouples which are assigned to one another are situated at different heights, this can result in inaccurate measurement results and misinterpretations especially if—as is common in practice—there is a non-negligible temperature gradient through the various depths of the liquid surrounding the measuring apparatus. In such an embodiment of the measuring apparatus, the number of possible measurement positions and thus the height resolution of the filling level display is additionally severely limited due to the geometric specifications of the probe housing or of the measurement tube housing. In addition, only one measuring unit or one thermal sensor can be realized for any given height; no provisions are made for redundancy. Finally, the apparatus according to the Russian patent RU 2153712 C1 also has the disadvantage that all heated thermocouples are heated by way of a common heating wire with series-connected heating zones. Should the wire be damaged and the flow of current interrupted, the entire measuring apparatus will fail.

SUMMARY OF THE INVENTION

It is accordingly an object of the invention to provide a device for measuring a fill level, which overcomes the above-mentioned disadvantages of the heretofore-known devices and methods of this general type and which enables particularly precise and reliable measurement of the filling level height while keeping the design simple and providing a high level of reliability and fail-safety.

With the foregoing and other objects in view there is provided, in accordance with the invention, an apparatus for measuring a filling level in a liquid vessel, in particular in a nuclear plant, comprising:

a plurality of elongate, mutually spaced-apart measurement tubes;

each measurement tube having a plurality of thermocouples distributed in a longitudinal direction thereof;

the plurality of thermocouples including a heated thermocouple disposed on the first measurement tube, heated by a heating element, and acting as a primary signal transmitter, and an unheated thermocouple, assigned to the heated thermocouple on a signal side thereof, disposed on a measurement tube other than the first measurement tube, and acting as a reference signal transmitter.

In other words, the objects are achieved according to the invention by way of an apparatus for measuring the filling level or by way of a filling level probe with a plurality of elongate, spaced-apart measurement tubes, each measurement tube having a number of thermocouples which are distributed in the longitudinal direction, wherein a thermocouple, which acts as a primary signal transmitter, is heated by a heating element and is arranged on a first measurement tube, has assigned to it on the signal side an unheated thermocouple, which acts as a reference signal transmitter and is arranged on a measurement tube which is different from the first measurement tube.

The invention is based on the consideration that, although it would always be possible to provide redundancy and fail-safety by way of simultaneously using a plurality of the already known measuring apparatuses, this would only partially compensate for the above-described disadvantages of the individual measuring apparatuses, in particular with respect to the measurement accuracy which can be achieved. Instead, the knowledge that, especially in the case of the cooling liquid in a reactor pressure vessel, but also in the case of many other systems, the variation of the liquid temperature in the lateral, i.e. horizontal, direction is generally less important than that in the geodetically vertical direction should consequently be put into action. That means the local temperature gradients inside the liquid, which are predefined or caused by the external (boundary) conditions and fluid dynamics and the transport of heat inside the liquid, usually play, in the direction of the height extent, a more important role than those in a direction which is perpendicular thereto and therefore must be taken into consideration more strongly when determining the filling level height from the temperature data. It is therefore easily possible, without experiencing any loss in terms of information content or measurement accuracy, to separate or distribute the individual measurement points in the lateral, i.e. horizontal, direction and to take advantage of the degrees of freedom gained thereby for realizing a particularly reliable and accurate measurement principle.

In the present case, this concept is implemented by a plurality of largely parallel measurement tubes which are immersed at right angles into the liquid and which all carry a number of thermocouples. In comparison with simply mounting measurement tubes of the same, already known type such that they are parallel, whose measurement signals are processed individually and converted to (redundant) filling level information, provision is now made for the primary signal transmitters and reference signal transmitters, which are directly associated on the signal side and assigned to one another, to be distributed over different, physically separate measurement tubes.

In other words, a heated thermocouple, arranged at a specific height, and which is mounted on or in a first measurement tube and also acts as a primary signal transmitter, that is to say reacts to changes in the heat transfer behavior which depends on the aggregate state of the surrounding medium, is assigned an unheated thermocouple, which is arranged on or inside a second measurement tube, as a reference signal transmitter, with the first and the second measurement tubes being spaced apart by a gap. Here, the data furnished by the reference thermocouple are processed in an evaluation unit together with the data of the primary thermocouple, wherein temporal fluctuations or changes in the coolant temperature which are caused by external circumstances are taken into account using the reference signals. By way of example, as a particularly simple measure for taking into account the surrounding temperatures, a difference signal can be formed from primary and reference signals.

Preferably, the heated thermocouple and the unheated thermocouple which is assigned to it on the signal side are situated at the same height, as a result of which a particularly precise measurement and reliable evaluation of the data is ensured in particular if there is a temperature gradient through the various coolant depths (i.e. in the vertical direction). Preferably, such pairs of heated and unheated thermocouples which are mounted on or in various measurement tubes are formed for all relevant heights. Due to the physical separation and arrangement on or in separate measurement tubes, an undesired reciprocal influence of the primary and reference signal transmitters is suppressed as far as possible since a direct heat transfer from the heated thermocouple to the unheated thermocouple, for example by way of heat conduction inside the measurement tube housing, is impossible.

In an advantageous development, the apparatus for measuring a filling level comprises at least three measurement tubes, wherein an unheated thermocouple, arranged on a first measurement tube, acts as a reference signal transmitter for at least two heated thermocouples and wherein the at least two heated thermocouples are arranged on measurement tubes which are different from the first measurement tube and preferably also different from one another. Preferably, here, all the thermocouples assigned to one another on the signal side are located in each case at the same height. The two heated thermocouples are thus used to achieve a redundancy with respect to the primary signals. Since the function of the unheated thermocouples is less at risk of incidents due to the absence of heating-related sources of errors or incidents, it generally suffices for a single unheated thermocouple to be used for a plurality of heated thermocouples as a reference signal transmitter. The unheated thermocouple is thus a constituent part of a plurality of pairings of signal transmitters which are interconnected for the purpose of the common signal evaluation. A person skilled in the art can of course realize other familiar redundancy structures within the context of the concept explained, for example triple redundancy of the primary signals or redundancy with respect to the reference signals.

Another advantageous embodiment provides for a measurement tube, preferably all measurement tubes, to comprise either only heated or only unheated thermocouples. In particular, a variant with three measurement tubes is expedient, one of which only having unheated thermocouples and the other two having only heated thermocouples, wherein in each case one unheated thermocouple is assigned on the signal side at least one heated thermocouple which is located at the same height. It is thus possible to mount all unheated reference thermocouples in a measurement tube in which no disturbing heating wire or other heating elements are arranged. In addition to undesired heating of the unheated thermocouples as a result of heat conduction inside the measurement tube, "convective" interaction is also avoided which could always arise if in a single measurement tube an unheated thermocouple is arranged above another, heated thermocouple. For example, the heated thermocouple could in that case heat the surrounding medium, as a result of which the latter would rise upward along the external wall of the tube and flow past the unheated thermocouple. The arrangement and constellation of the thermocouples according to the concept envisaged here avoids such problems and therefore enables a particularly accurate and undisturbed measurement of the reference temperature (s).

Since in the latter case the measurement tubes with the heated thermocouples do not need to hold any unheated thermocouples, they will comprise additional installation space which can, if appropriate, be fitted with further measurement positions such that there is a particularly high sensor density, that is to say a high spatial resolution. An alternative design aim can be to distribute the heated thermocouples in the case of a rather low "density", i.e. number per unit length, over a plurality of measurement tubes such that the heated thermocouples, too, influence one another inside a measurement tube as little as possible, for example by heat conduction in the measurement tube housing or inside the tube.

Advantageously, all heated thermocouples of a measurement tube have a common heating wire assigned to them. This may be a wire which is guided past all the thermocouples to be heated and has series-connected heating zones with comparatively high electric resistance, which are positioned in each case near the thermocouple to be heated. In an advantageous alternative embodiment, each of the heated thermocouples of a measurement tube has assigned its own heating element. In this variant, due to the individual regulation of the heating current or of the heating voltage, it is possible to heat every individual thermocouple in a particularly exact and tailored manner. In addition, a thermocouple can be used optionally as a heated or unheated thermocouple.

Preferably, the measurement probes of the appliance for measuring the filling level are enclosed by a common protective housing having a number of passage openings for the purpose of equalizing the liquid level with the surrounding area. The protective housing does not only protect the measurement tubes against external mechanical influences but, in particular when the measuring apparatus is used in a reactor pressure vessel of a nuclear power plant, prevents the cooling liquid circulating in the primary circuit from impacting on the measurement tubes at a comparatively high flow rate, as a result of which the measurement results could be falsified. Instead, the flow of liquid in the direct vicinity of the measurement tubes is calmed by the protective housing, wherein the passage openings, however, are dimensioned such that the liquid level inside the protective housing can quickly adapt to a changing external liquid level. In addition, in the case of two-phase mixtures, separation into the liquid and the gaseous component is assisted, as a result of which an effective liquid level is established inside the protective housing or the protective tube, the height of which liquid level is then measured.

As already mentioned in the introduction, the apparatus for monitoring the filling level is advantageously a constituent part of the safety devices in a nuclear reactor, in particular in a pressurized-water reactor. Of course, other areas of use in which a simple, precise and robust measurement of the filling level even under adverse surrounding conditions is important are also conceivable.

The advantages achieved by way of the invention are in particular that the physical separation of different sensor types, which are complementary to one another on the signal side, and their distribution over a plurality of physically spaced-apart measurement tubes are used to realize an apparatus for measuring a filling level which is particularly suitable for precision measurements and is largely resistant to disturbing external and internal influences. In addition, it is possible in the novel embodiment to design all the essential components of the apparatus to be redundant without a high degree of extra outlay, which is particularly advantageous especially in safety-critical areas of use, for example in a nuclear-engineering plant. Since it is possible to assign to each heated thermocouple which acts as a primary signal transmitter an unheated reference thermocouple which is located at the same height, a particularly precise statement about the filling level can be made at any time, independently of surrounding influences.

Other features which are considered as characteristic for the invention are set forth in the appended claims.

Although the invention is illustrated and described herein as embodied in apparatus for measuring a filling level, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
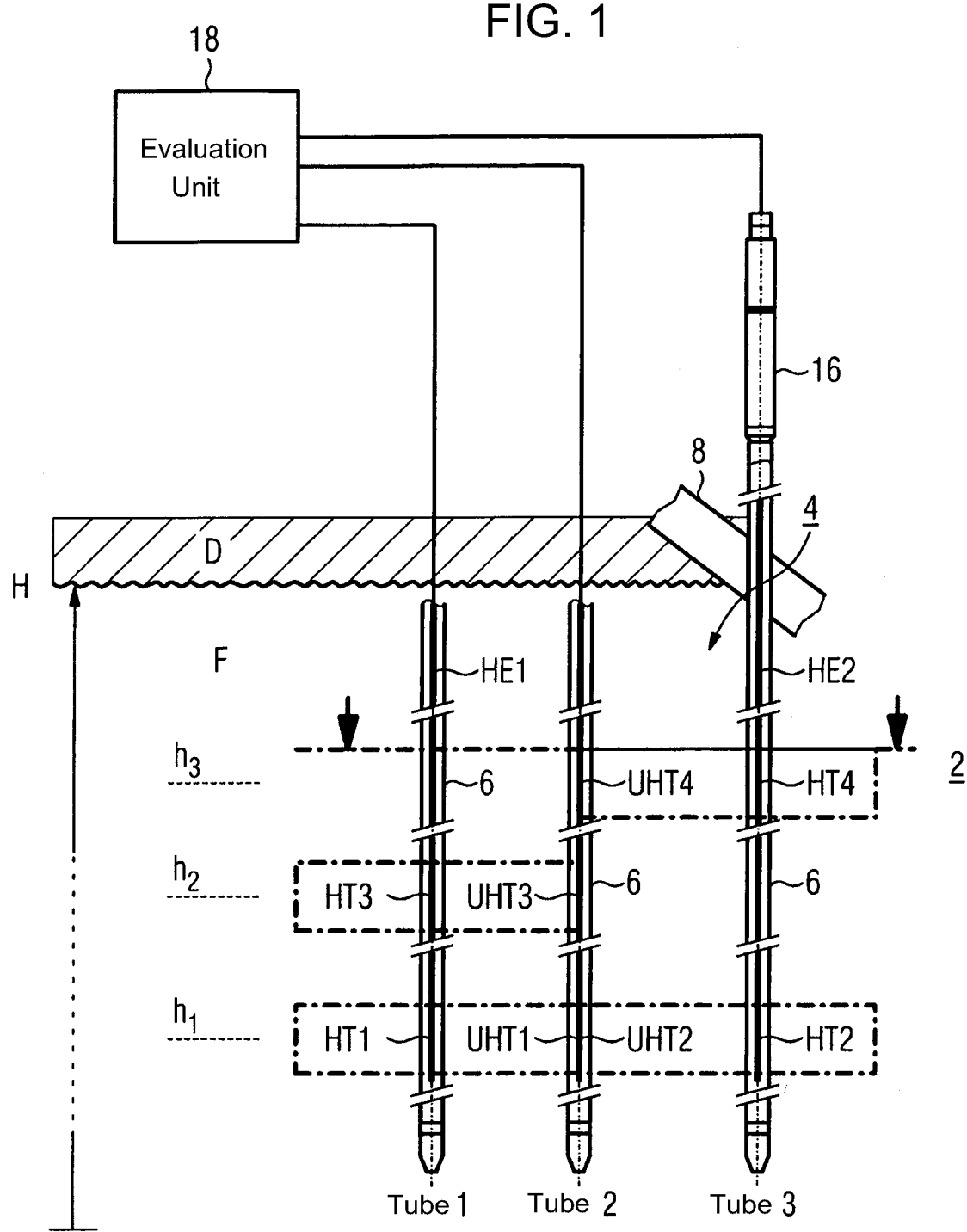
FIG. 1 is a schematic, partially cut-away side view of an apparatus for measuring the filling level according to the invention.

Referring now to the figures of the drawing in detail and first, particularly, to FIG. 1 thereof, the apparatus 2 according to the invention is configured for measuring a filling level or fill level, to monitor the level position of a cooling liquid F in a reactor pressure vessel 4 of a pressurized-water reactor (PWR). The apparatus 2 comprises three elongate measurement tubes 6, designed in the manner of a measurement lance, which measurement tubes 6 are inserted, during the mounting operation of the measuring apparatus 2, into the inside of the reactor pressure vessel 4 from above through cutouts, which are provided for this purpose, in the cover panel 8 and are immersed during the operation of the nuclear reactor at least partially in the cooling liquid F. The level height or filling level height above the base of the vessel is denoted as H in FIG. 1, wherein of course other reference standards can also be used. Vaporous cooling medium, vapor D for short, is located above the liquid level.

Figure 2:
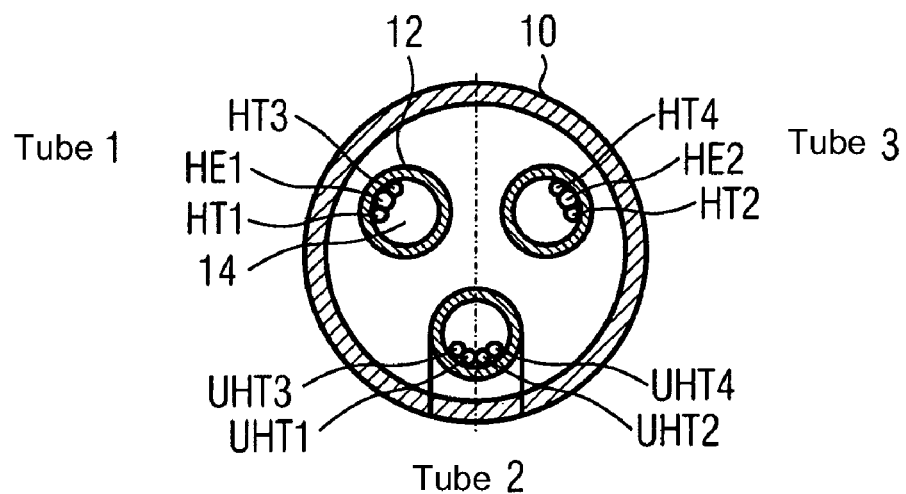
FIG. 2 shows a cross section through the apparatus from FIG. 1.

The three measurement tubes 6 of the filling level probe 2 are in each case aligned vertically and are mounted in the reactor pressure vessel 4 such that they are spaced apart; this means they are located parallel to one another, but without touching each other. As can be seen in the cross section according to FIG. 2, the three measurement tubes 6 are arranged approximately at the corner points of an equilateral triangle. The spacing between in each case two measurement tubes 6 is the same for all pairings and is typically about 0.5 cm to 1.5 cm. The three tubes 6 are enclosed by a cylindrical protective tube 10 which has, at least in the lower and upper edge region, a number of passage or ventilation openings (not illustrated further here) such that the level position of the cooling liquid F inside the protective tube 10 can always adapt to the external level position in the reactor pressure vessel 4 without any external intervention and without any significant time delay. Any flow turbulences or the like are calmed in the process, with the result that the measurement tubes 6 arranged inside the protective tube 10 are protected against such influences. The protective tube 10 is not shown in the side view according to FIG. 1, for the sake of clarity.

Each of the three measurement tubes 6 has a cylindrical housing 12 which is closed at the lower end such that it is water-tight, which housing has an internal diameter of approximately 1 cm and a wall thickness of approximately 2 mm and is made of a water-impermeable, pressure-stable, corrosion-resistant and highly heat-conductive material. For this purpose, a stainless steel is used in the exemplary embodiment. In the internal space 14 of every measurement tube 6, a number of thermocouples is arranged. The measurement tube denoted "tube 1" includes two heated thermocouples, that is the heated thermocouple HT1, which is located at a height $h_1$, and the heated thermocouple HT3, which is arranged thereabove at a height $h_2$. The measurement tube denoted as "tube 3" includes, in its internal space 14, likewise two heated thermocouples, that is the heated thermocouple HT2 at height $h_1$ and, thereabove, the heated thermocouple HT4 at height $h_3$. Generally, $h_3 > h_2 > h_1$, wherein the spacings between the heights in the exemplary embodiment are the same. Furthermore, heating elements are arranged in the internal space 14 of tube 1 and tube 3, that is HE1 in tube 1 and HE2 in tube 3. The heating elements are in case in the form of heating wires which are guided past the thermocouples HT1 and HT3, or HT2 and HT4, to be heated, wherein the heating wires have in the vicinity of said thermocouples heating zones, by means of which the surroundings are heated. Both the heating elements HE1 and HE2 and the thermocouples HT1 and HT3, or HT2 and HT4, bear directly against the internal wall of the highly heat-conductive housing 12, wherein the heating elements are "framed" or flanked in each case on both sides by the thermocouples (see FIG. 2). The heating wires and the signal and supply lines necessary for the supply of power or the transmission of signals to the thermocouples are guided in the internal space 14 of the respective measurement tube 6 up to a connection adapter 16 which is located outside the cover panel 8 of the reactor pressure vessel 4. The thermocouples HT1 to HT4 are, on the signal side, connected to an electronic evaluation unit 18 (indicated only schematically here) via the two connection adapters 16.

The measurement tube 6 designated "tube 2" includes in its internal space 14 four unheated thermocouples, two of which are arranged at height $h_1$ (UHT1 and UHT2), and in each case one at height $h_2$ and at $h_3$ (UHT3 and UHT4). The unheated thermocouples UHT1 to UHT4 also have in each case direct contact with the internal wall of the highly heat-conductive housing 12 and are connected on the signal side to the externally positioned evaluation unit 18 via a connection adapter (not illustrated further here). However, no heating device or the like of any kind is provided in tube 2.

For the purposes of evaluating signals and determining a filling level, in each case one heated thermocouple (primary signal transmitter) and an unheated thermocouple (reference signal transmitter) which is located at the same height—inside another measurement tube—are combined. In the signal processing in the evaluation unit, the four pairs (HT1, UHT1) to (HT4, UHT4) are thus formed, which is indicated in FIG. 1 schematically by way of the dotted lines framing the mutually complementary thermocouples.

Figure 3:
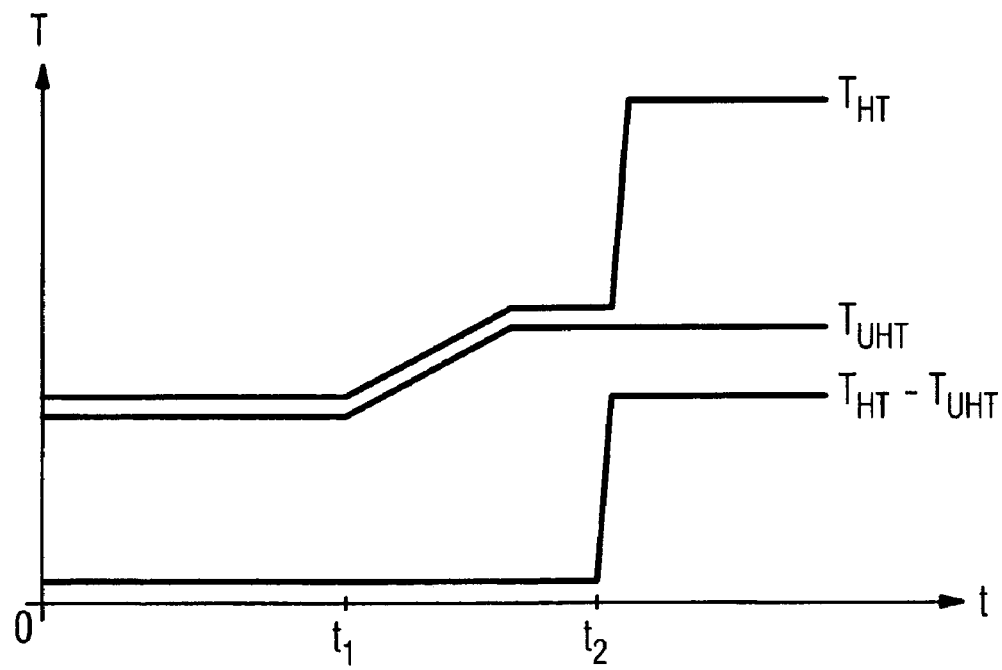
FIG. 3 is a diagram illustrating the measurement principle, in which the data, ascertained by a primary signal transmitter and a reference signal transmitter assigned to it, and an associated difference signal are illustrated as a function of time.

The mode of operation of the heated and unheated thermocouples and their use for measuring a filling level are described by way of example using the signal transmitter pair (HT4, UHT4). First, a regular reactor operation is assumed with constant filling level height H in the reactor pressure vessel 4 and with intact cooling circuit, i.e. temporally constant coolant temperature. As long as the level position of the cooling liquid F is above the installation height of the heated thermocouple HT4 (H>$h_3$), the heat output by the heating element HE2 in the vicinity of the thermocouple HT4 is comparatively effectively dissipated through the housing wall of the housing 12 and transferred to the cooling liquid F. Since continually new, i.e. cold, cooling liquid F flows into the reactor pressure vessel (open system in terms of thermodynamics), the wall temperature in the vicinity of the thermocouple HT4 hardly rises with respect to the unheated case, represented by the unheated thermocouple UHT4. The temperature profile derived in each case from the thermovoltages of the mutually assigned thermocouples (temperatures $T_{HT}$ and $T_{UHT}$) at the site of the thermocouples is illustrated by way of example in FIG. 3 as a function of the time. Up to time $t_1$, the profile corresponds to the scenario just described. Likewise plotted in the diagram is the temperature difference $T_{HT}-T_{UHT}$ which, up to the time $t_1$, is near zero.

At time $t_1$, a reactor incident is assumed which leads, with initially constant filling level height H of the cooling liquid F in the reactor pressure vessel 4, to a (global) rise in the coolant temperature. As a result, the temperature of the external wall of all three measurement tubes 6 rises. In particular, the temperature detected by the thermocouples UHT4 and HT4 rises to the same extent. Any effects present of a temperature layering, i.e. temperature gradients in the vertical direction, are of no importance since the two measurement positions which are assigned to one another are located at the same height, that is $h_3$. The temperature difference $T_{HT}-T_{UHT}$ thus remains approaching zero during the time interval $t_1$ to $t_2$.

This only changes at time $t_2$, when—as is assumed here—the filling level height H of the cooling liquid F drops below the height $h_3$ (H<$h_3$). Although at first the surrounding temperatures at the two measurement positions do not change significantly, since the vapor D located above the liquid level has similar temperatures to the cooling liquid F, the heat transfer properties in relation to the heat transfer at the site of the heated thermocouple HT4 deteriorate suddenly. The amount of heat released by the heating element HE2 can in this case no longer be transported to the surrounding area to the same extent as before, with the result that the temperature $T_{HT}$ measured by the thermocouple HT4 increases drastically, see FIG. 3. Thus, the sudden increase in the temperature difference between heated and unheated thermocouple from time $t_2$ is a reliable indicator for the filling level height having sunk below height $h_3$. Similar considerations apply to heights $h_2$ and $h_1$.

Since the sinking of the cooling liquid below the height $h_1$ is regarded as being particularly critical, monitoring the filling level with respect to this height is particularly safeguarded. The two sensor pairs (HT1, UHT1) and (HT2, UHT2) provide two independent redundant measurements. In an alternative embodiment (not shown here), redundancy is provided only with respect to the two heated thermocouples HT1 and HT2, whereas only a single unheated thermocouple, i.e. either UHT1 or UHT2, is provided as the reference signal transmitter for these two heated thermocouples.

The invention claimed is:
1. An apparatus for measuring a filling level in a liquid vessel, comprising:
    at least three elongate, mutually spaced-apart measurement tubes, including a first measurement tube;
    each said measurement tube having a plurality of thermocouples distributed in a longitudinal direction thereof;

said plurality of thermocouples including at least two heated thermocouples each disposed on a respective one of said measurement tubes, heated by heating elements, and acting as a primary signal transmitters, and an unheated thermocouple, assigned to said heated thermocouples on a signal side thereof, disposed on a measurement tube other than said respective measurement tubes, and acting as a reference signal transmitter for said at least two heated thermocouples.

2. The apparatus according to claim 1, configured to measure a fill-level in a reactor vessel of a nuclear plant.

3. The apparatus according to claim 1, which comprises a plurality of heated thermocouples and unheated thermocouples assigned to one another in pairs, in each case one heated thermocouple is assigned on the signal side an unheated thermocouple, and the two thermocouples of a respective said pair are arranged in each case on different ones of said measurement tubes.

4. The apparatus according to claim 1, wherein two said thermocouples of at least one primary signal/reference signal pair, formed by a heated thermocouple and an unheated thermocouple, are disposed at a common height.

5. The apparatus according to claim 4, wherein two said thermocouples of all primary signal/reference signal pairs are respectively disposed at a mutually common height.

6. The apparatus according to claim 1, wherein one said measurement tube includes either only heated thermocouples or only unheated thermocouples.

7. The apparatus according to claim 1, wherein all of said measurement tubes include either only heated thermocouples or only unheated thermocouples.

8. The apparatus according to claim 1, wherein one of said three measurement tubes only having unheated thermocouples and the other two measurement tubes having only heated thermocouples, and wherein in each case one unheated thermocouple is assigned on the signal side at least one heated thermocouple located at the same height.

9. The apparatus according to claim 1, which comprises a common heating wire assigned to all heated thermocouples of a measurement tube.

10. The apparatus according to claim 1, wherein each heated thermocouple of a measurement tube has assigned thereto a separate heating element.

11. The apparatus according to claim 1, which comprises a common protective housing or protective tube enclosing said measurement tubes, said common protective housing or protective tube having a plurality of passage openings for equalizing a liquid level with a surrounding area.

12. A nuclear plant, comprising an apparatus according to claim 1 for monitoring a filling level.

13. A pressurized-water reactor, comprising an apparatus according to claim 1 for monitoring a filling level.

* * * * *